(12) United States Patent
Shan

(10) Patent No.: US 9,127,709 B2
(45) Date of Patent: Sep. 8, 2015

(54) JOINT MECHANISM AND SUPPORTING DEVICE THEREWITH

(71) Applicant: Lin-Hai Shan, Guangdong (CN)

(72) Inventor: Lin-Hai Shan, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 189 days.

(21) Appl. No.: 13/940,236

(22) Filed: Jul. 11, 2013

(65) Prior Publication Data

US 2014/0014791 A1    Jan. 16, 2014

(30) Foreign Application Priority Data

Jul. 13, 2012   (CN) .......................... 2012 1 0243738

(51) Int. Cl.
| | |
|---|---|
| *A47B 91/00* | (2006.01) |
| *F16C 11/10* | (2006.01) |
| *F16M 11/00* | (2006.01) |
| *A47D 1/02* | (2006.01) |
| *A47D 9/00* | (2006.01) |

(52) U.S. Cl.
CPC . *F16C 11/10* (2013.01); *A47D 1/02* (2013.01); *A47D 9/005* (2013.01); *F16M 11/00* (2013.01); *F16C 2314/70* (2013.01); *Y10T 403/32262* (2015.01)

(58) Field of Classification Search
CPC .... F16C 11/10; F16M 11/10; F16M 11/2021; A47D 1/006; A47D 1/02; A47D 9/005; A47D 9/00

USPC .......... 248/188.7, 168, 169, 163.1, 166, 171, 248/188.6; 297/183.2, 183.3, 183.4; 403/83, 84, 91, 92, 93, 97, 104, 105, 403/107

See application file for complete search history.

(56) References Cited

U.S. PATENT DOCUMENTS

| | | | | |
|---|---|---|---|---|
| 5,951,102 | A * | 9/1999 | Poulson et al. ................ | 297/130 |
| 6,347,830 | B1 * | 2/2002 | Chen .......................... | 297/16.1 |
| 2006/0061066 | A1 | 3/2006 | Tan | |
| 2011/0148155 | A1 | 6/2011 | Chapman | |
| 2012/0104808 | A1 * | 5/2012 | Sellers et al. .............. | 297/183.4 |

FOREIGN PATENT DOCUMENTS

| | | |
|---|---|---|
| CN | 201104673 Y | 8/2008 |
| DE | 203 10 316 U1 | 9/2003 |
| EP | 2 409 893 A2 | 1/2012 |
| EP | 2 409 893 A3 | 9/2012 |
| WO | 2011161392 A1 | 12/2011 |

* cited by examiner

*Primary Examiner* — Christopher Garft
(74) *Attorney, Agent, or Firm* — Winston Hsu; Scott Margo

(57) ABSTRACT

The present invention relates to a joint mechanism connected to at least two supporting components of a supporting device. The joint mechanism includes a first joint component connected to one of the at least two supporting components, a second joint component connected to the other of the at least two supporting components and pivoted to the first joint component, and a triggering component movably connected to the first joint component for selectively engaging with or separating from the second joint component. The joint mechanism facilitates folding or unfolding the supporting device. The present invention further relates to the supporting device with the joint mechanism.

21 Claims, 9 Drawing Sheets

JOINT MECHANISM AND SUPPORTING DEVICE THEREWITH

BACKGROUND OF THE INVENTION

1. Field of the Invention

The present invention relates to a joint component and a supporting device therewith, and more especially, to a joint component and a supporting device therewith with convenient and easy operation.

2. Description of the Prior Art

There are different kinds of infant carriers in the market, such as a traditional weaving basket and a carrier adapting to a child safety seat in vehicle. An infant carrier shows its excellence and applicability as moving a child by hand or by vehicles. It can solve a problem of being unable to put down a baby even though a career feels tired as carrying baby in arms or that the baby is too little to be fastened by a seatbelt or other fasten belt. It is convenient for parents in taking the child outdoors as using the infant carrier.

However, the infant carrier needs to be put on a particular infant carriage or a particular supporting device. There are many kinds of the infant carriers, and each supporting device is adapting to one certain kind of the infant carrier accordingly. Besides, it is inconvenient to fold the supporting device, and the folded supporting device is not able to stand so as to be carried inconveniently. The conventional mechanical design of the supporting device brings limitation in using the supporting device. Therefore, it is a significant issue to solve these problems.

SUMMARY OF THE INVENTION

A purpose of the present invention is to provide a joint mechanism and a supporting device therewith capable of being folded and operated easily and conveniently, to solve the problems mentioned above.

The present invention is to provide a joint mechanism connected to at least two supporting components of a supporting device. The joint mechanism includes a first joint component connected to one of the at least two supporting components, a second joint component connected to the other of the at least two supporting components and pivoted to the first joint component, and a triggering component movably connected to the first joint component for selectively engaging with or separating from the second joint component.

Preferably, the joint mechanism further includes a first leg connected to one of the at least two supporting components and the first joint component, and a second leg connected to the other of the at least two supporting components and the second joint component.

According to an embodiment of the disclosure, the first joint component includes a first plate and a first sidewall connected to a periphery of the first plate, the second joint component includes a second plate and a second sidewall connected to a periphery of the second plate and pivotally connected to the first sidewall, and the triggering component is movably connected to the first plate for selectively engaging with or separating from the second sidewall.

According to the embodiment of the disclosure, a sliding slot is disposed on the first plate, and the triggering component includes a sliding block slidably installed inside the sliding slot.

According to the embodiment of the disclosure, an opening is formed on the first sidewall, and the triggering component includes a button passing through the opening.

Preferably, the sliding block is surrounded by the first plate, the first sidewall, the second plate and the second sidewall and is contained inside the first joint component and the second joint component.

Preferably, at least one part of the button is exposed out of the first joint component and the second joint component.

According to the embodiment of the disclosure, a main sunken portion is formed on the second sidewall, the triggering component includes a main protrusion for selectively engaging with or separating from the main sunken portion, and the at least two supporting components move away from each other for unfolding the supporting device as the main protrusion is engaged with the main sunken portion.

According to the embodiment of the disclosure, a main concave portion is formed on the second sidewall for selectively engaging with or separating from the main protrusion, the at least two supporting components move close to each other for folding the supporting device as the main protrusion is engaged with the main concave portion.

Preferably, an inclined surface is formed on an inner surface of the main concave portion close to the main sunken portion.

Preferably, a vertical surface is formed on an inner surface of the main concave portion away from the main sunken portion.

Preferably, a depth of the main concave portion is less than a depth of the main sunken portion.

According to the embodiment of the disclosure, a constraining slot is disposed on the second sidewall, and the first joint component further includes a constraining block connected to the first sidewall and slidably installed inside the constraining slot.

According to the embodiment of the disclosure, the first joint component further includes a pivoting shaft connected to a center of the first plate, and the second joint further includes a pivoting pillar connected to a center of the second plate and pivotally connected to the pivoting shaft.

Preferably, a pivoting hole is formed on the pivoting pillar, and the pivoting shaft is pivotally installed inside the pivoting hole.

According to the embodiment of the disclosure, an auxiliary sunken portion is formed on the pivoting pillar, and the triggering component includes an auxiliary protrusion for selectively engaging with or separating from the auxiliary sunken portion, and the at least two supporting components move away from each other for unfolding the supporting device as the auxiliary protrusion is engaged with the auxiliary sunken portion.

According to the embodiment of the disclosure, an auxiliary concave portion is formed on the pivoting pillar for selectively engaging with or separating from the auxiliary protrusion, the at least two supporting components move close to each other for folding the supporting device as the auxiliary protrusion is engaged with the auxiliary concave portion.

Preferably, an inclined surface is formed on an inner surface of the auxiliary concave portion close to the auxiliary sunken portion.

Preferably, a vertical surface is formed on an inner surface of the auxiliary concave portion far away from the auxiliary sunken portion.

Preferably, a depth of the auxiliary concave portion is less than a depth of the auxiliary sunken portion.

According to an embodiment of the disclosure, the joint mechanism further includes a resilient component disposed between the first joint component and the triggering component for resiliently contacting with the first joint component and the triggering component.

The present invention is further to provide, a supporting device including at least two supporting components and a joint mechanism connected to the at least two supporting components. The joint mechanism includes a first joint component connected to one of the at least two supporting components, a second joint component connected to the other of the at least two supporting components and pivoted to the first joint component, and a triggering component movably connected to the first joint component for selectively engaging with or separating from the second joint component.

Preferably, the supporting device further includes a seat component detachably connected to the joint mechanism.

The joint mechanism and the supporting device therewith can effectively fold or unfold the supporting components easily and conveniently.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
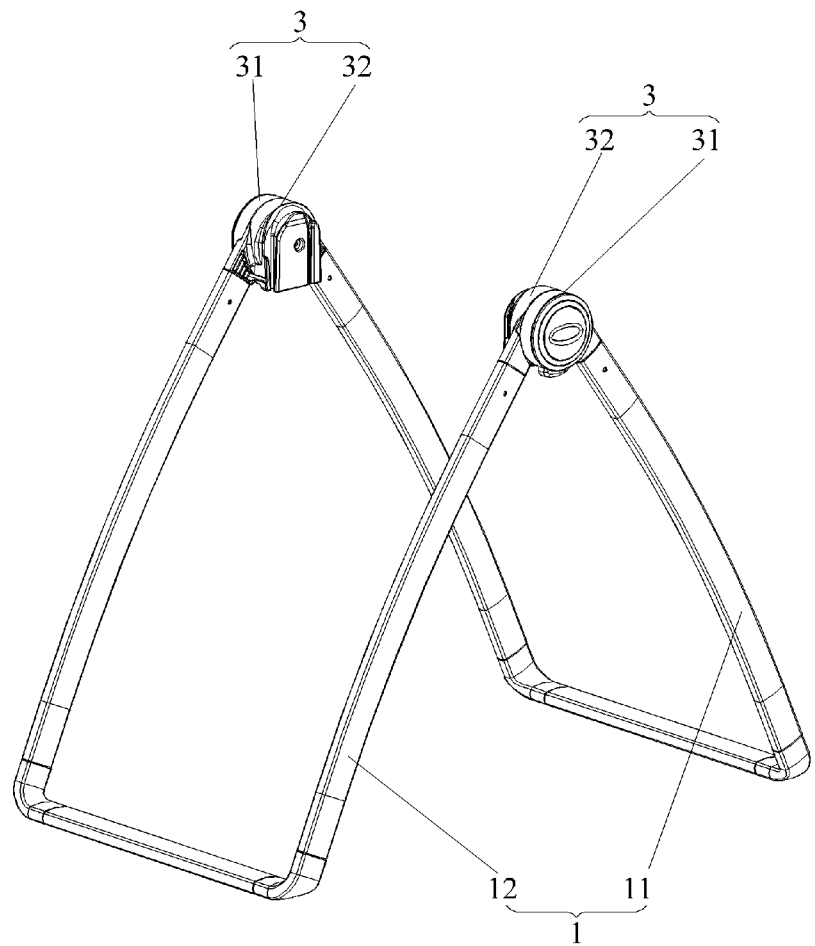
FIG. 1 is a diagram of a supporting device according to an embodiment of the present invention.
Figure 2:
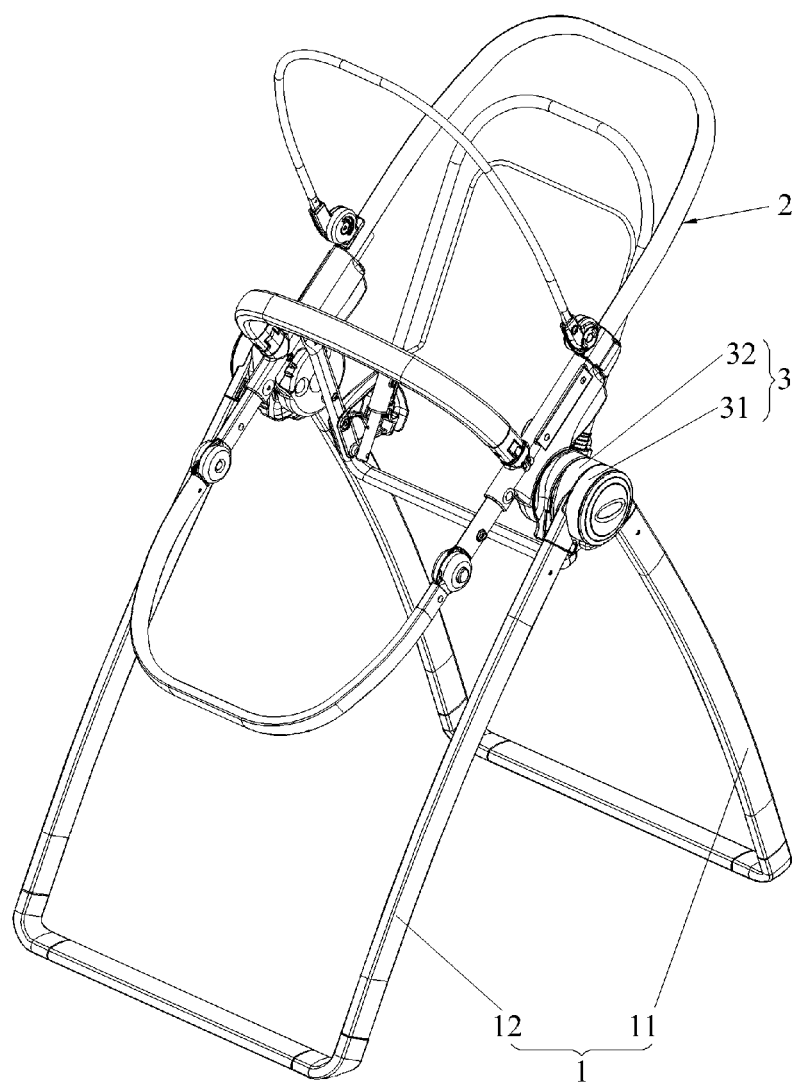
FIG. 2 to FIG. 4 are assembly diagrams of the supporting device in different applications according to the embodiment of the present invention.
Figure 3:
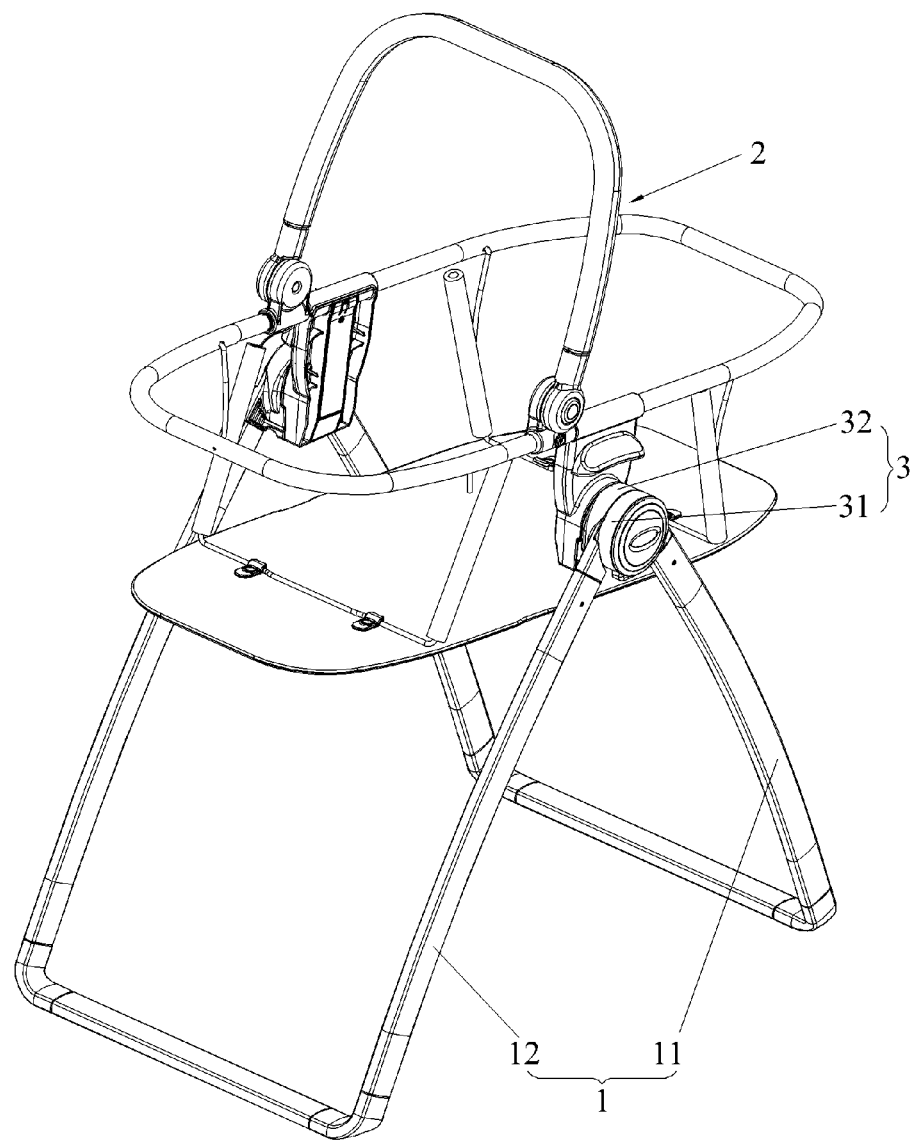
Figure 4:
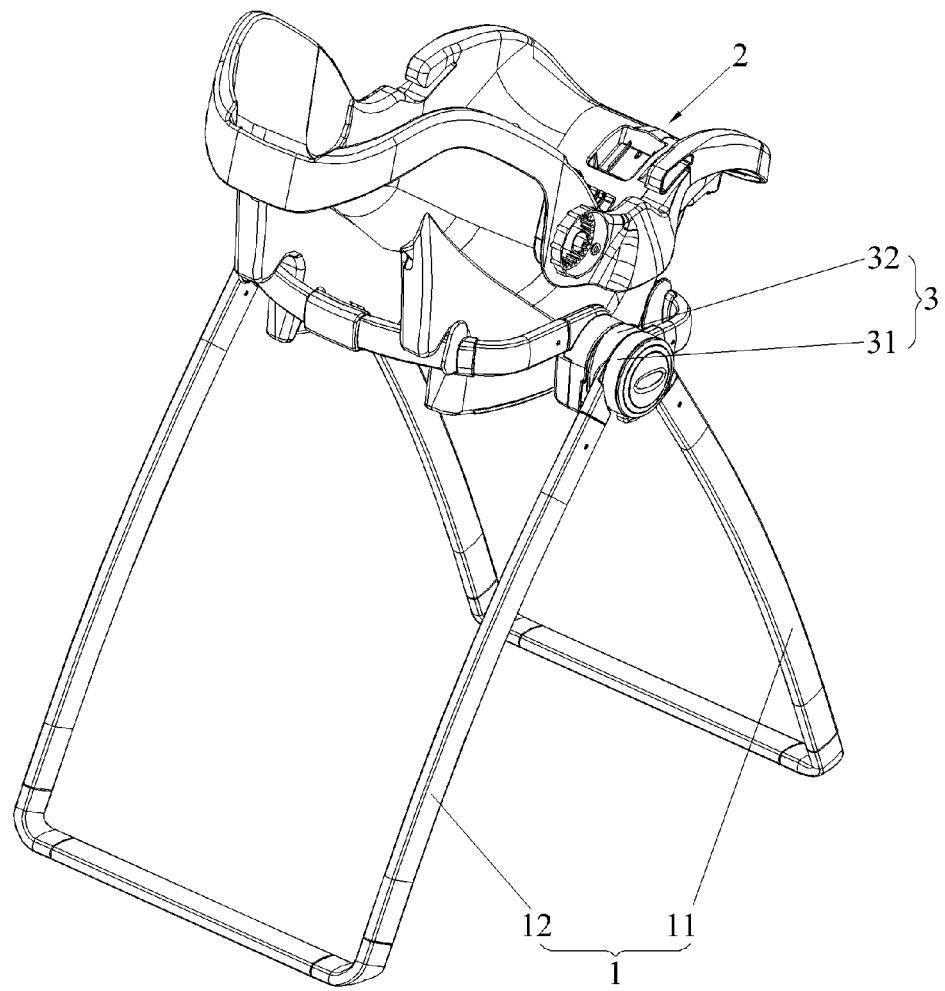

Please refer to FIG. 1 to FIG. 4. FIG. 1 is a diagram of a supporting device 1 according to an embodiment of the present invention. FIG. 2 to FIG. 4 are assembly diagrams of the supporting device 1 in different applications according to the embodiment of the present invention. The supporting device 1 includes at least two supporting components 11, 12, and a joint mechanism 3. The supporting device 1 further includes a seat component 2 detachably connected to the joint mechanism 3, such as an infant basket, a crib, a baby chair, a child safety seat, and so on. The joint mechanism 3 is connected to the at least two supporting components 11, 12. The joint mechanism 3 includes a first joint component 31, a second joint component 32, a triggering component 33 and a resilient component 34. The first joint component 31 is connected to one of the at least two supporting components 11 and 12, the second joint component 32 is connected to the other of the at least two supporting components 11, 12 and pivoted to the first joint component 31. According to this embodiment, the first joint component 31 is connected to the supporting component 11, and second joint component 32 is connected to the supporting component 12. The triggering component 33 is movably connected to the first joint component 31 for selectively engaging with or separating from the second joint component 32.

Figure 5:
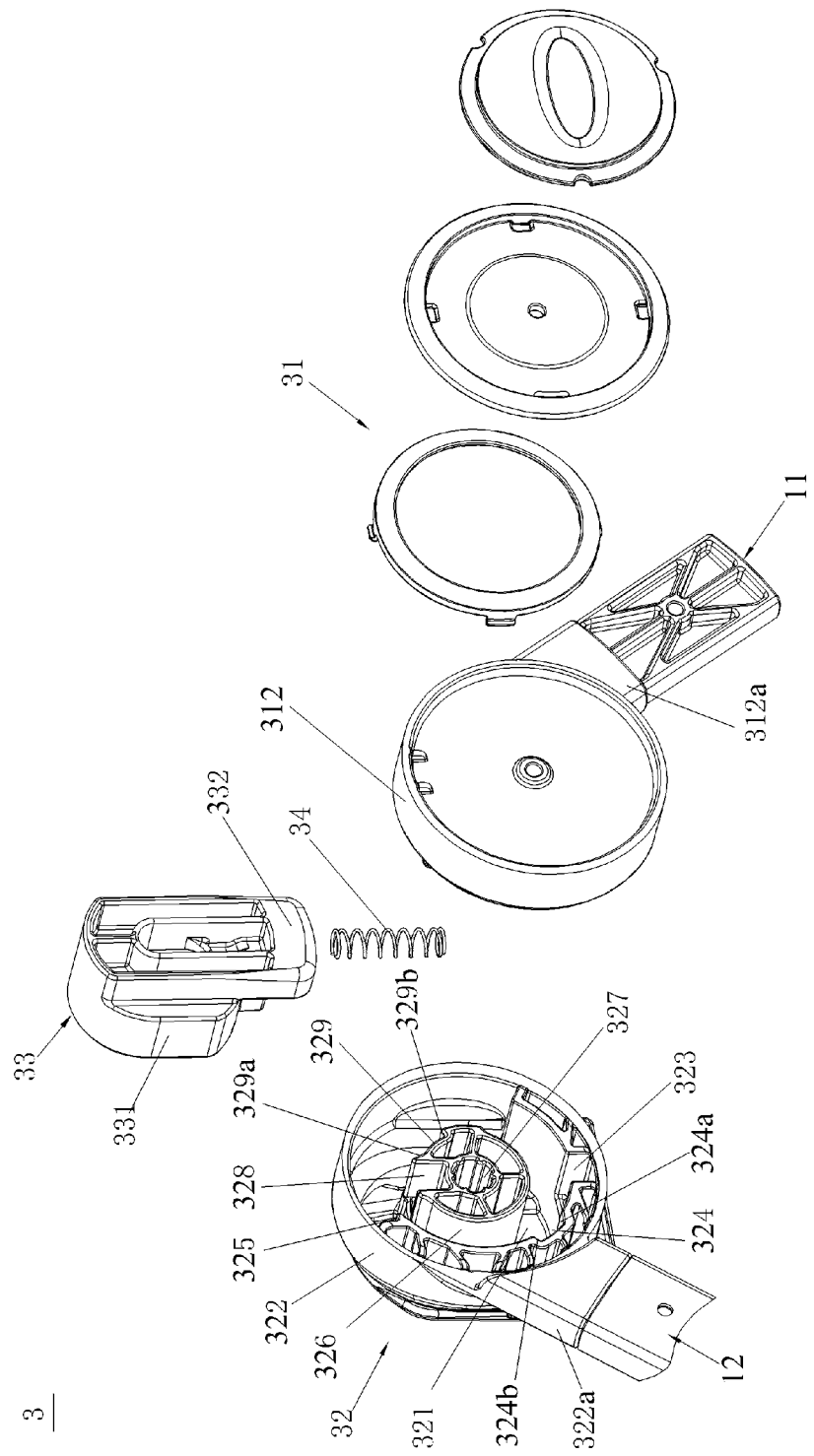
FIG. 5 and FIG. 6 are exploded diagrams of a joint mechanism in different views according to the embodiment of the present invention.
Figure 6:
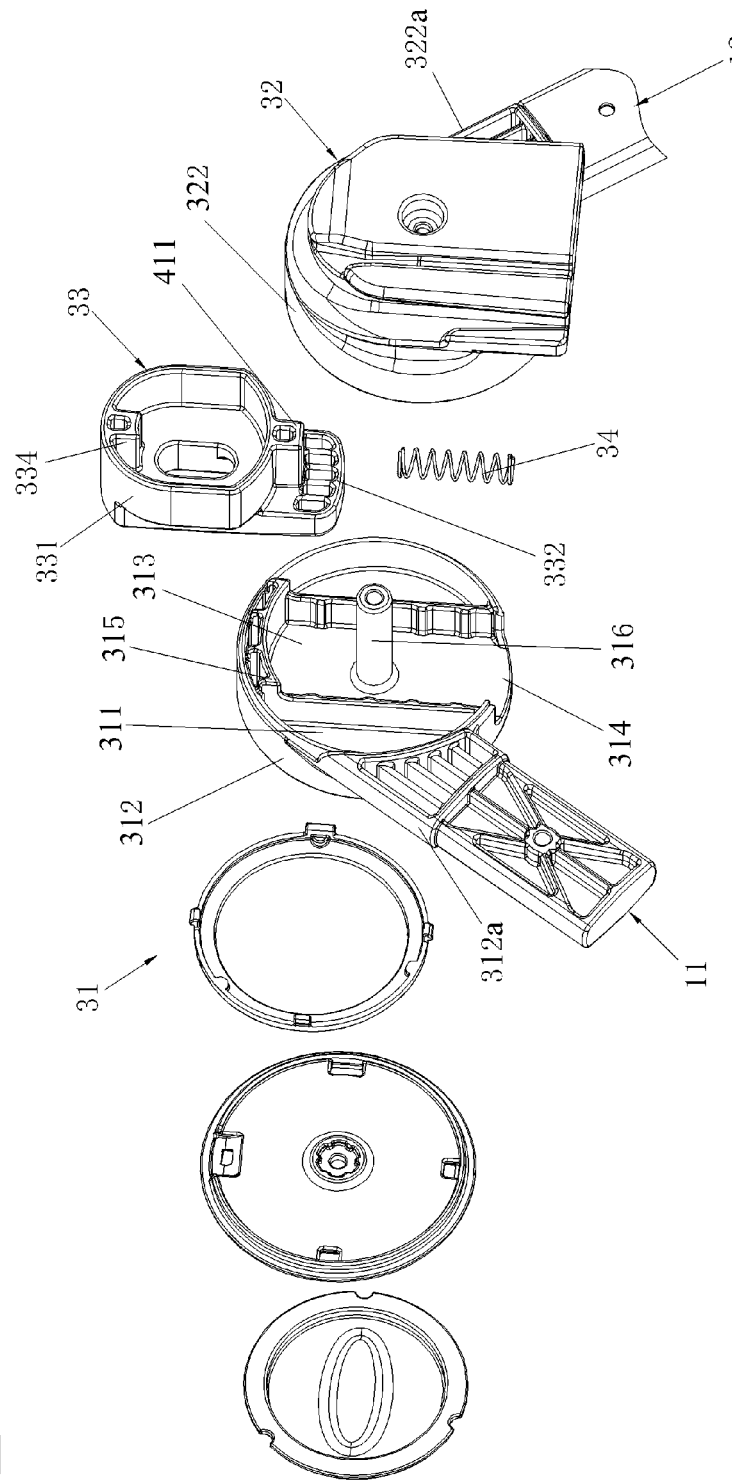

Please refer to FIG. 5 and FIG. 6. FIG. 5 and FIG. 6 are exploded diagrams of the joint mechanism 3 in different views according to the embodiment of the present invention. The joint mechanism 3 includes a first leg 312a and a second leg 322a. The first leg 312a is connected to one of the at least two supporting components 11, 12 and the first joint component 31. The second leg 322a is connected to the other of the at least two supporting components 11, 12 and the second joint component 32. According to this embodiment, the first leg 312a is connected to the support component 11 and the first joint component 31, and the second leg 322a is connected to the support component 12 and the second joint component 32.

Furthermore, the first joint component 31 includes a first plate 311 and a first sidewall 312 vertically connected to a periphery of the first plate 311. The second joint component 32 includes a second plate 321 and a second sidewall 322 vertically connected to a periphery of the second plate 322 and pivotally connected to the first sidewall 312. The triggering component 33 is movably connected to the first plate 311 for selectively engaging with or separating from the second sidewall 322. In general, the first leg 312a is connected to the first sidewall 312, and the second leg 322a is connected to the second sidewall 322. Alternatively, the first leg 312a also can be connected to the first plate 311, and the second leg 322a also can be connected to second plate 321.

To achieve that the triggering component 33 can be movably connected to the first plate 311, a sliding slot 313 is disposed on the first plate 311, and the triggering component 33 includes a sliding block 331 slidably installed inside the sliding slot 313. The sliding block 331 is surrounded by the first plate 311, the first sidewall 312, the second plate 321 and the second sidewall 322, and the sliding block 331 is contained inside the first joint component 31 and the second joint component 32, so as to prevent interference in the sliding block 331 from the outside as the sliding block 331 is slidably installed inside the sliding slot 313, resulting in enhanced protection and stability. In addition, an opening 314 is formed on the first sidewall 312 and communicated with the sliding slot 313. The triggering component 33 includes a button 332 passing through the opening 314, and at least one part of the button 332 is exposed out of the first joint component 31 and the second joint component 32. A user can easily operate the button 332 for pushing the sliding block 331 to move the triggering component 33 outside the first joint component 31 and the second component 32.

Please refer to FIG. 1, FIG. 5 and FIG. 6. A main sunken portion 323 is formed on the second sidewall 322, the triggering component 33 includes a main protrusion 333 for selectively engaging with or separating from the main sunken portion 323. The at least two supporting components 11, 12 move away from each other for unfolding the supporting device 1 as the main protrusion 333 is engaged with the main sunken portion 323. In addition, a main concave portion 324 is formed on the second sidewall 322 for selectively engaging with or separating from the main protrusion 323. The at least two supporting components 11, 12 move close to each other for folding the supporting device 1 as the main protrusion 323 is engaged with the main concave portion 324. The above structural design can provide enough structural strength to ensure the supporting device 1 not to loose and be unfolded.

Figure 7:
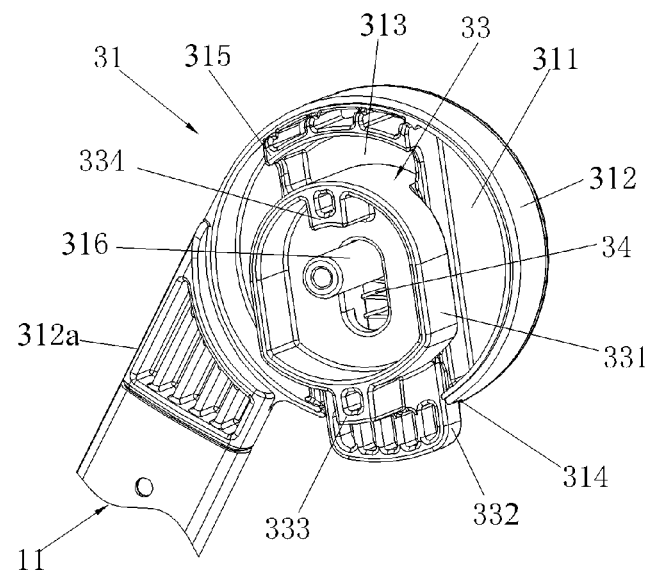
FIG. 7 and FIG. 8 are different partial exploded diagrams of the joint mechanism according to the embodiment of the present invention.
Figure 8:
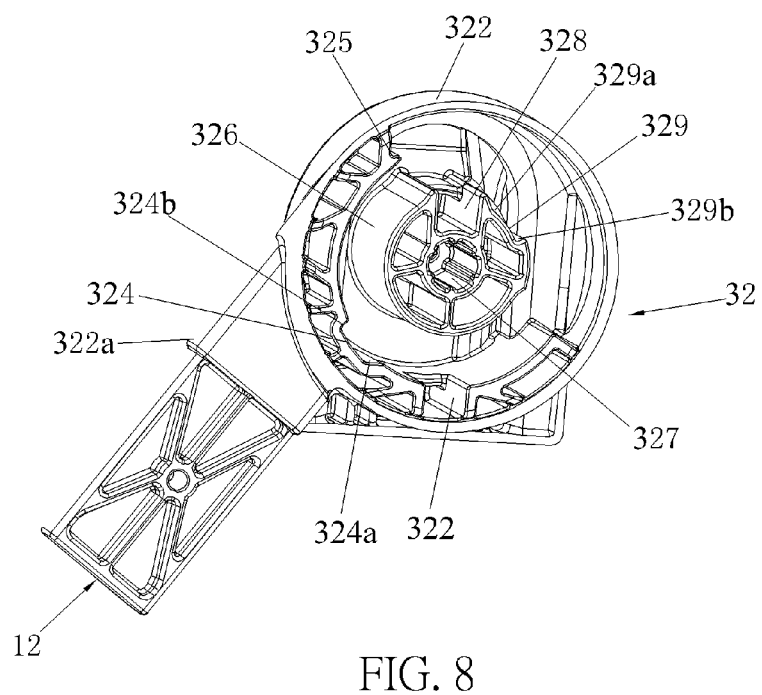

Please refer to FIG. 1, FIG. 7 and FIG. 8. FIG. 7 and FIG. 8 are different partial exploded diagrams of the joint mechanism 3 according to the embodiment of the present invention. An inclined surface 324a is formed on an inner surface of the main concave portion 324 close to the main sunken portion 323. A vertical surface 324b is formed on an inner surface of the main concave portion 324 away from the main sunken portion 323. A depth of the main concave portion 324 is less than a depth of the main sunken portion 323. As the at least two supporting components 11, 12 move close to each other until the main protrusion 333 engages with the main concave portion 324 so as to fold the supporting device 1, the vertical surface 324b is to prevent the at least two supporting components 11, 12 from moving too close so that the supporting device 1 is not able to stand stably. As moving the at least two supporting components 11, 12 away from each other for unfolding the supporting device 1, it only applies less force for separating the at least two supporting components 11, 12 and it is not necessary to press the triggering component 33 because the main protrusion 333 is easy to detach from the main concave portion 324 due to the less depth of the main concave portion 324 and the inclined surface 324a.

In addition, a constraining slot 325 is disposed on the second sidewall 322, the first joint component 31 further includes a constraining block 315 connected to the first sidewall 312 and slidably installed inside the constraining slot 325. A movement of the pivoting between the first joint component 31 and the second component 32 is constrained by the engagement of the constraining block 315 and the constraining slot 325. For example, the first joint component 31 and the second joint component 32 mutually pivot for moving the at least two components 11, 12 close to or far way from each other as the main protrusion 333 separates from the main sunken portion 323 or the main concave portion 324. The engagement of the constraining block 315 and the constraining slot 325 is to prevent the at least two supporting components 11, 12 from moving too close or too far away from each other. Besides, the engagement of the constraining block 315 and the constraining slot 325 enhances the engagement of the main protrusion 333 with the main sunken portion 323 or the main concave portion 324.

For strengthening the pivotal connection between the first joint component 31 and the second joint component 32, the first joint 31 further includes a pivoting shaft 316 connected to a center of the first plate 311, and the second joint component 32 further includes a pivoting pillar 326 connected to a center of the second plate 321 and pivotally connected to the pivoting shaft 316. Preferably, a pivoting hole 327 is formed on the pivoting pillar 326, and the pivoting shaft 316 is pivotally installed inside the pivoting hole 327.

Figure 9:
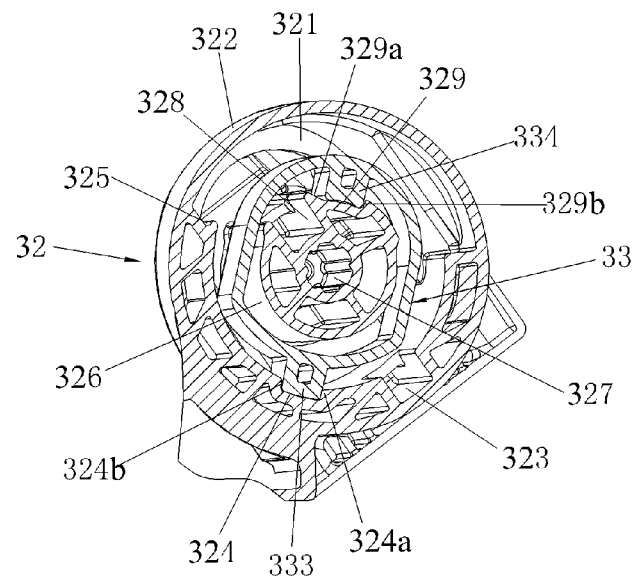
FIG. 9 is a cross-section diagram of the joint mechanism according to the embodiment of the present invention.
Figure 10:
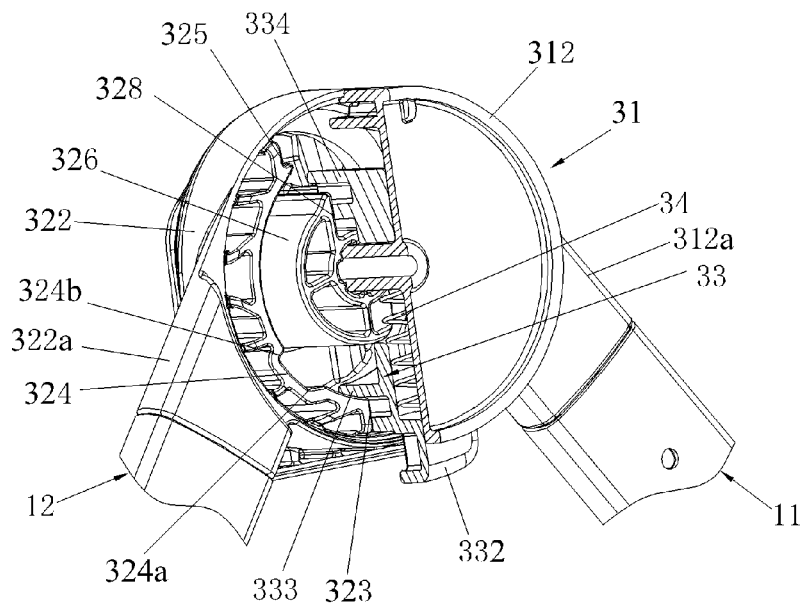
FIG. 10 is a partial cross-section diagram of the joint mechanism according to the embodiment of the present invention.

Please refer to FIG. 1, FIG. 9 and FIG. 10. FIG. 9 is a cross-section diagram of the joint mechanism 3 according to the embodiment of the present invention. FIG. 10 is a partial cross-section diagram of the joint mechanism 3 according to the embodiment of the present invention. For strengthening the engagement of the first joint component 31 and the second joint component 32, an auxiliary sunken portion 328 is formed on the pivoting pillar 326, and the triggering component 33 includes an auxiliary protrusion 334 for selectively engaging with or separating from the auxiliary sunken portion 328. The at least two supporting components 11, 12 move away from each other for unfolding the supporting device 1 as the auxiliary protrusion 334 is engaged with the auxiliary sunken portion 328. In addition, an auxiliary concave portion 329 is formed on the pivoting pillar 326 for selectively engaging with or separating from the auxiliary protrusion 334. The at least two supporting components 11, 12 move close to each other for folding the supporting device 1 as the auxiliary protrusion 334 is engaged with the auxiliary concave portion 329.

Furthermore, an inclined surface 329a is formed on an inner surface of the auxiliary concave portion 329 close to the auxiliary sunken portion 328. A vertical surface 329b is formed on an inner surface of the auxiliary concave portion 329 far away from the auxiliary sunken portion 328. A depth of the auxiliary concave portion 329 is less than a depth of the auxiliary sunken portion 328. The engagement of the auxiliary protrusion 334 with the auxiliary sunken portion 328 or the auxiliary concave portion 329 is as same as the engagement of the main protrusion 333 with the main sunken portion 323 or the main concave portion 324, and detailed description is not reiterated.

Figure 11:
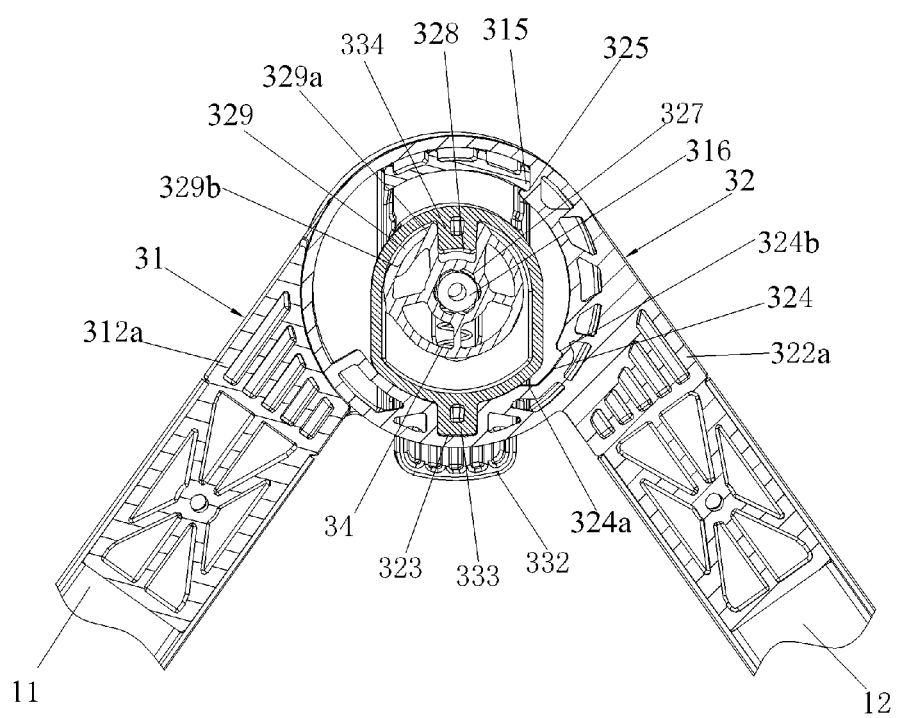
FIG. 11 is another cross-section diagram of the joint mechanism according to the embodiment of the present invention.

Please refer to FIG. 10 and FIG. 11. FIG. 11 is another cross-section diagram of the joint mechanism 3 according to the embodiment of the present invention. The joint mechanism 3 further includes a resilient component 34 disposed between the first joint component 31 and the triggering component 33 for resiliently contacting with the first joint component 31 and the triggering component 33. The resilient component 34 is resiliently connected with the pivoting shaft 316 and the sliding block 331. Accordingly, the resilient component 34 pushes the sliding block 331 toward the first sidewall 312 to strengthen the engagement. The main protrusion 333 can continuously engage with the main sunken portion 323 or the main concave portion 328, and the auxiliary protrusion 334 can continuously engage with the auxiliary sunken portion 324 or the auxiliary concave portion 329 by disposing the resilient component 34 between the first joint component 31 and the triggering component 33. In addition, the resilient component 34 can push the triggering component 33 after the button 332 is pressed, so that a user does not have to pull up the button 332 to recover the button 332.

In contrast to the prior art, the joint mechanism and the supporting device therewith can effectively fold or unfold the supporting components easily and conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joint mechanism connected to at least two supporting components of a supporting device, the joint mechanism comprising:
   a first joint component connected to one of the at least two supporting components, the first joint component comprising a first plate and a first sidewall connected to a periphery of the first plate;
   a second joint component connected to the other of the at least two supporting components and pivoted to the first joint component, the second joint component comprising a second plate and a second sidewall connected to a periphery of the second plate and pivotally connected to the first sidewall; and a triggering component movably connected to the first plate of the first joint component for selectively engaging with or separating from the second sidewall of the second joint component;

wherein a constraining slot is disposed on the second sidewall, and the first joint component further comprises a constraining block connected to the first sidewall and slidably installed inside the constraining slot.

2. The joint mechanism of claim 1, further comprising:
a first leg connected to one of the at least two supporting components and the first joint component; and
a second leg connected to the other of the at least two supporting components and the second joint component.

3. The joint mechanism of claim 1, wherein a sliding slot is disposed on the first plate, and the triggering component comprises a sliding block slidably installed inside the sliding slot.

4. The joint mechanism of claim 3, wherein the sliding block is surrounded by the first plate, the first sidewall, the second plate and the second sidewall and is contained inside the first joint component and the second joint component.

5. The joint mechanism of claim 1, wherein an opening is formed on the first sidewall, and the triggering component comprises a button passing through the opening.

6. The joint mechanism of claim 5, wherein at least one part of the button is exposed out of the first joint component and the second joint component.

7. The joint mechanism of claim 1, wherein a main sunken portion is formed on the second sidewall, the triggering component comprises a main protrusion for selectively engaging with or separating from the main sunken portion, and the at least two supporting components move away from each other for unfolding the supporting device as the main protrusion is engaged with the main sunken portion.

8. The joint mechanism of claim 7, wherein a main concave portion is formed on the second sidewall for selectively engaging with or separating from the main protrusion, the at least two supporting components move close to each other for folding the supporting device as the main protrusion is engaged with the main concave portion.

9. The joint mechanism of claim 8, wherein an inclined surface is formed on an inner surface of the main concave portion close to the main sunken portion.

10. The joint mechanism of claim 8, wherein a vertical surface is formed on an inner surface of the main concave portion away from the main sunken portion.

11. The joint mechanism of claim 8, wherein a depth of the main concave portion is less than a depth of the main sunken portion.

12. The joint mechanism of claim 1, wherein the first joint component further comprises a pivoting shaft connected to a center of the first plate, and the second joint component further comprises a pivoting pillar connected to a center of the second plate and pivotally connected to the pivoting shaft.

13. The joint mechanism of claim 12, wherein a pivoting hole is formed on the pivoting pillar, and the pivoting shaft is pivotally installed inside the pivoting hole.

14. The joint mechanism of claim 12, wherein an auxiliary sunken portion is formed on the pivoting pillar, and the triggering component comprises an auxiliary protrusion for selectively engaging with or separating from the auxiliary sunken portion, and the at least two supporting components move away from each other for unfolding the supporting device as the auxiliary protrusion is engaged with the auxiliary sunken portion.

15. The joint mechanism of claim 14, wherein an auxiliary concave portion is formed on the pivoting pillar for selectively engaging with or separating from the auxiliary protrusion, the at least two supporting components move close to each other for folding the supporting device as the auxiliary protrusion is engaged with the auxiliary concave portion.

16. The joint mechanism of claim 15, wherein an inclined surface is formed on an inner surface of the auxiliary concave portion close to the auxiliary sunken portion.

17. The joint mechanism of claim 15, wherein a vertical surface is formed on an inner surface of the auxiliary concave portion away from the auxiliary sunken portion.

18. The joint mechanism of claim 15, wherein a depth of the auxiliary concave portion is less than a depth of the auxiliary sunken portion.

19. The joint mechanism of claim 1, further comprising a resilient component disposed between the first joint component and the triggering component for resiliently contacting with the first joint component and the triggering component.

20. A supporting device comprising:
at least two supporting components; and
a joint mechanism connected to the at least two supporting components, the joint mechanism comprising:
a first joint component connected to one of the at least two supporting components, the first joint component comprising a first plate and a first sidewall connected to a periphery of the first plate;
a second joint component connected to the other of the at least two supporting components and pivoted to the first joint component, the second joint component comprising a second plate and a second sidewall connected to a periphery of the second plate and pivotally connected to the first sidewall; and
a triggering component movably connected to the first plate of the first joint component for selectively engaging with or separating from the second sidewall of the second joint component;
wherein a constraining slot is disposed on the second sidewall, and the first joint component further comprises a constraining block connected to the first sidewall and slidably installed inside the constraining slot.

21. The supporting device of claim 20, wherein the supporting device further comprises a seat component detachably connected to the joint mechanism.

* * * * *